US008924331B2

(12) United States Patent
Pekar et al.

(10) Patent No.: US 8,924,331 B2
(45) Date of Patent: Dec. 30, 2014

(54) SYSTEM AND METHOD FOR SOLVING QUADRATIC PROGRAMMING PROBLEMS WITH BOUND CONSTRAINTS UTILIZING A SEMI-EXPLICIT QUADRATIC PROGRAMMING SOLVER

(75) Inventors: Jaroslav Pekar, Pacov (CZ); Ondrej Santin, Svijany (CZ)

(73) Assignee: Honeywell International Inc., Morristown, NJ (US)

( * ) Notice: Subject to any disclaimer, the term of this patent is extended or adjusted under 35 U.S.C. 154(b) by 478 days.

(21) Appl. No.: 12/875,239

(22) Filed: Sep. 3, 2010

(65) Prior Publication Data

US 2012/0059782 A1    Mar. 8, 2012

(51) Int. Cl.
G06N 5/02      (2006.01)
G06F 17/00     (2006.01)
G05B 13/04     (2006.01)
G06F 17/11     (2006.01)

(52) U.S. Cl.
CPC ............. *G06F 17/11* (2013.01); *G05B 13/048* (2013.01)
USPC .......................................................... 706/46

(58) Field of Classification Search
USPC .......................................................... 706/46
See application file for complete search history.

(56) References Cited

U.S. PATENT DOCUMENTS

| | | | |
|---|---|---|---|
| 2008/0230637 | A1 | 9/2008 | Havlena et al. |
| 2009/0083126 | A1* | 3/2009 | Koren et al. .................. 705/10 |
| 2009/0254202 | A1 | 10/2009 | Pekar et al. |
| 2010/0017094 | A1 | 1/2010 | Stewart et al. |
| 2010/0049480 | A1 | 2/2010 | Pekar et al. |

OTHER PUBLICATIONS

Axehill, Daniel and Anders Hansson "A dual Gradient Projection Quadratic Programming Algorithm Tailored for Mixed INteger Predictive Control" Automatic Control Jan. 2008 [Online] Downloaded Sep. 18, 2012 http://www.control.isy.liu.se/research/reports/2008/2833.pdf.*

Caron, Thomas and Robert Silverman. "Parallel Implementation of the Quadratic Sieve" THe Journal of Supercomputing, 1988 [Online] Downloaded Feb. 27, 2013. http://link.springer.com/10.1007/02FBF00154339?LI=true&from=SL;bcsi-ac-2160f1cfec5c399f=2012EBD500000102CcuOudEaTApgL/EVay+2sbDgzZMODgAAAgEAAFbENACEAwAAAAAAA J9SFwA=.*

Axehill, Daniel and Anders Hansson "A dual gradient Proejction Quadratic Programming Algoriithm Tailored for MIxed INteger Predictive Contro" Auatomatic Control Jan. 2008 [Online] Downloaded Feb. 27, 2013 http://www.control.isy.liu.se/research/reports/2008/2833.pdf.*

Mayne, D. Q., et al., "Constrained model predictive control: Stability and optimality," *Automatica* (2000) 36:789-814.

* cited by examiner

*Primary Examiner* — Ben Rifkin
(74) *Attorney, Agent, or Firm* — Seager Tufte & Wickhem LLC.

(57) ABSTRACT

A system and method for solving a quadratic programming optimization problem with bound constraints using a semi-explicit QP solver with respect to an embedded platform is presented. A linear system of equations associated with a matrix (e.g., a Karush-Kuhn-Tucker matrix, KKT system) can be solved at each iteration of the solver based on a factorization approach. A set of partial factors with respect to the QP problem can be pre-computed off-line and stored into a memory. The factorization process of the KKT matrix can then be finished on-line in each iteration of the semi-explicit QP solver in order to effectively solve the QP optimization problems. The QP problem can be solved utilizing a standard active-set approach and/or a partial explicit approach based on a processor utilization and memory usage.

18 Claims, 5 Drawing Sheets

SYSTEM AND METHOD FOR SOLVING QUADRATIC PROGRAMMING PROBLEMS WITH BOUND CONSTRAINTS UTILIZING A SEMI-EXPLICIT QUADRATIC PROGRAMMING SOLVER

TECHNICAL FIELD

Embodiments are generally related to process control systems and methods. Embodiments are also related to MPC (Model-based Predictive Control) processes. Embodiments are additionally related to quadratic programming (QP) solvers. Embodiments are further related to solving quadratic programming problems with bound constraints.

BACKGROUND OF THE INVENTION

A common approach utilized in advanced industrial process control is Model-based Predictive Control, also known as "MPC". MPC typically involves the use of a controller that utilizes a mathematical model of the process to predict the future behavior of the control system and formulate a control problem as a constrained optimization. The accuracy of the internal process model is crucial to control performance.

Control problems associated with MPC controllers are generally formulated as parametric quadratic programming (QP) problems. In standard industrial MPC applications, the sampling periods are typically on the order of seconds and minutes. Such sampling periods are sufficient for solving the QP problems utilizing, for example, a standard personal computer.

MPC is becoming increasingly popular in embedded process control applications such as, for example, automotive and aircraft control systems. In such control applications, the sampling frequencies are higher and computational resources such as, CPU and memory, are limited. Hence, a need exists for a fast and tailored QP solver for embedded applications with limited CPU and memory in order to utilize the MPC control approach under such conditions.

Most prior art approaches for solving the QP optimization problems utilize an active-set approach or an interior point approach. Such prior art approaches are sufficiently fast for process control applications running on the standard personal computers, but are not directly applicable for fast sampling control applications that run on embedded platforms. Multi-parametric quadratic programming (MPQP) solvers that include an off-line part and an on-line part can be alternatively employed for solving the control problems in the embedded applications. The MPQP can be solved by using an explicit approach based on the active-set approach in which the space of a parameter vector is divided into a number of sub-spaces/regions. Such regions are further stored into a memory for the on-line phase.

The online phase of the MPQP includes an algorithm for searching the region for a measured parameter vector and the algorithm is periodically executed in each sampling period. Such an approach can be employed for very small control problems only due to exponential growth of memory requirements. The number of computations involved in such complete enumeration strategies grows rapidly with the dimension sizes and length of the horizon, making the strategies slow to run and unsuitable for real time control of complex processes by using embedded platform (e.g. ECU for automotive applications).

Based on the foregoing, it is believed that a need exists for an improved system and method for solving a quadratic programming optimization problem using a semi-explicit QP solver, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved process control system and method.

It is another aspect of the disclosed embodiments to provide for an improved semi-explicit quadratic programming (QP) solver.

It is a further aspect of the disclosed embodiments to provide for an improved system and method for solving a quadratic programming optimization problem with bound constraints using a semi-explicit QP solver for an embedded platform.

It is yet another aspect of the disclosed embodiments to provide for an improved semi-explicit QP solver approach that can be utilized in a variety of applications including, but not limited to, for example, automotive (engine control) and aerospace applications.

The aforementioned aspects and other objectives and advantages can now be achieved as described herein. A system and method for solving a quadratic programming optimization problem with bound constraints using a semi-explicit QP solver with respect to an embedded platform, is disclosed herein. The semi-explicit solver is based on an active-set approach. In each iteration of the semi-explicit QP solver, it is necessary to solve a set of linear equations. This set of equations is known as the Karush-Kuhn-Tucker (KKT) system. The KKT system is defined by a set of active constraints and this set of active constraints forms a so called KKT matrix. Factorizing the KKT matrix in combination with back substitution can solve the KKT system. Factorization is the critical part, which influences the CPU utilization in the on-line part of the solver. Therefore, a sub-set of factors for the QP problem can be pre-computed off-line and part of these factors (e.g. few rows for each KKT matrix) can be stored into a memory for the on-line part. The factorization is then finished in the on-line part of the semi-explicit QP solver. Therefore, it is not necessary to perform the full factorization in the on-line part and thus the CPU utilization is decreased.

The semi-explicit QP solver can be implemented as a core algorithm of MPC (Model Predictive Control) controller in a wide range of embedded applications. The QP problem arising from MPC can be solved based on the standard active-set approach if the embedded platform is equipped with a powerful CPU. The fully explicit approach can be employed to solve the QP problem if the CPU is too slow and includes a large amount of memory. The semi-explicit QP solver enables selectable allocation between CPU utilization and available storage. In limit cases, the semi-explicit QP solver can be configured as a standard active-set solver or as a fully explicit solver.

The MPC controller with the semi-explicit QP solver can be implemented as a part of an Electronic Controller Unit (ECU) in embedded platform applications. The semi-explicit solution of the optimization problem supports applicability to control, systems with a relatively fast-sampling and low computation power and memory. Such an approach enables selectable allocation between the CPU utilization and memory based on the configuration and capability of the embedded platform.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
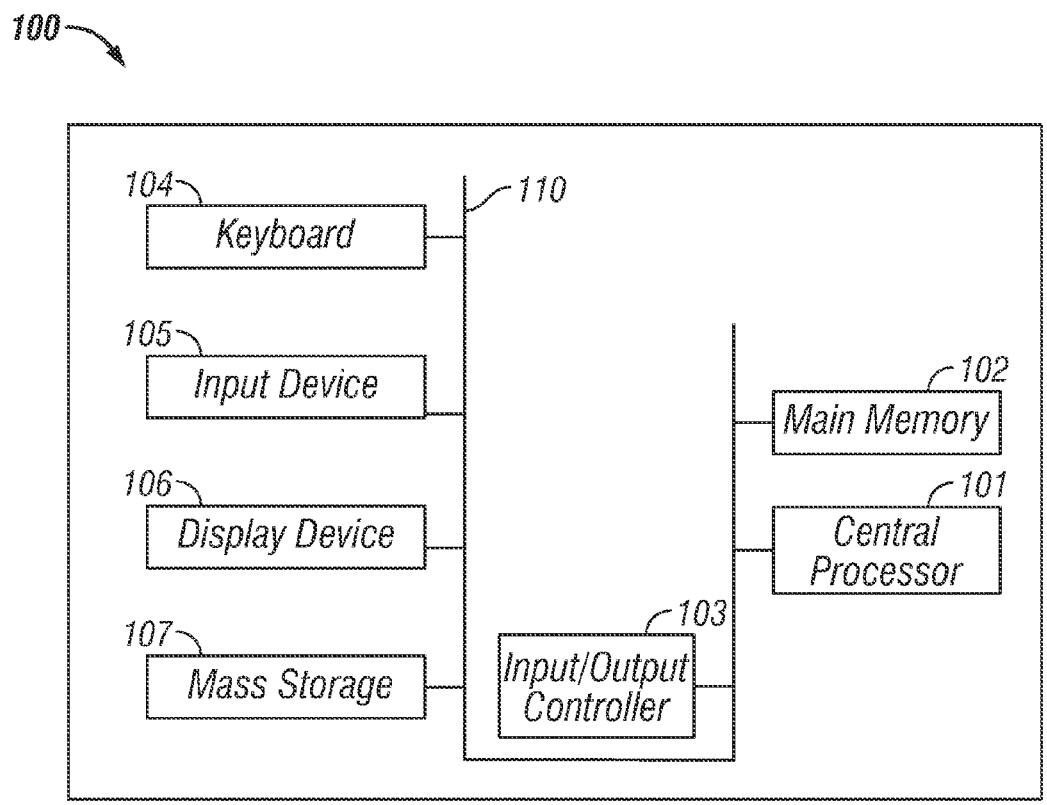
FIG. 1 illustrates a schematic view of a data-processing system, in accordance with the disclosed embodiments.
Figure 2:
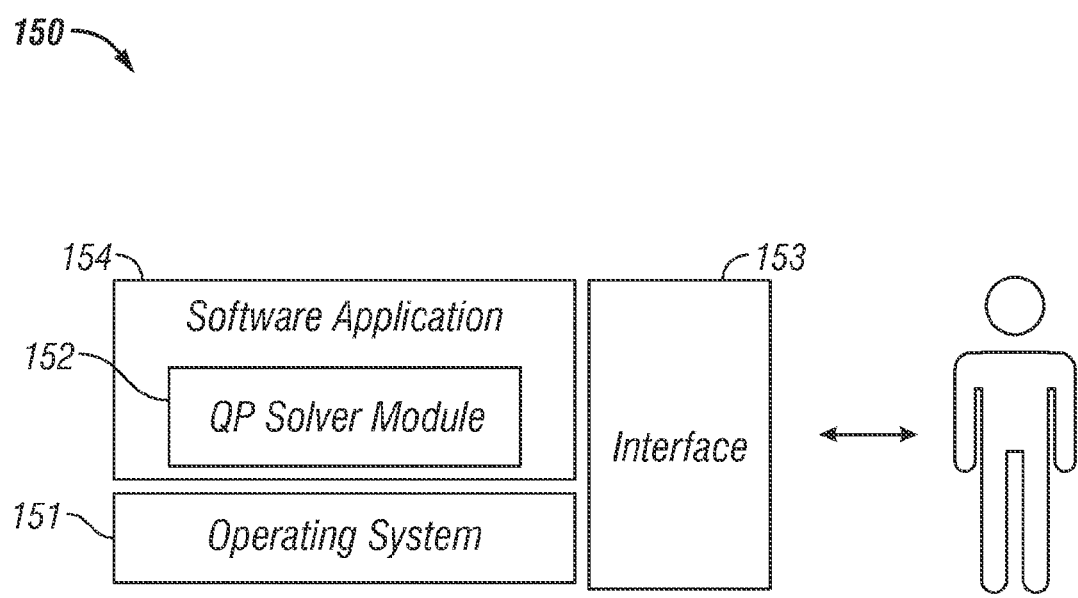
FIG. 2 illustrates a schematic view of a software system including operating system, application software, and a user interface for carrying out an embodiment.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, and a mass storage 107 (e.g., a hard disk). Additional input/output devices such as a keyboard 104, an input device 105 (e.g., a pointing device, such as a mouse, track ball, pen device, etc), and a display device 106 may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of operating systems and interfaces may be alternatively utilized. For example, rather than a traditional "Windows" system, other operation systems such as, for example, a Real Time Operating System (RTOS) more commonly employed in wireless systems may also be employed with respect to operating system 151 and interface 153. The software application 154 can include, for example, a quadratic programming (QP) solver module 152 for solving QP optimization problems. The QP solver module 152 can include instructions such as those of method 350 discussed herein with respect to FIG. 4.

FIGS. 1-2 are thus intended as an example and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms including Macintosh, UNIX, LINUX, and the like.

Figure 3:
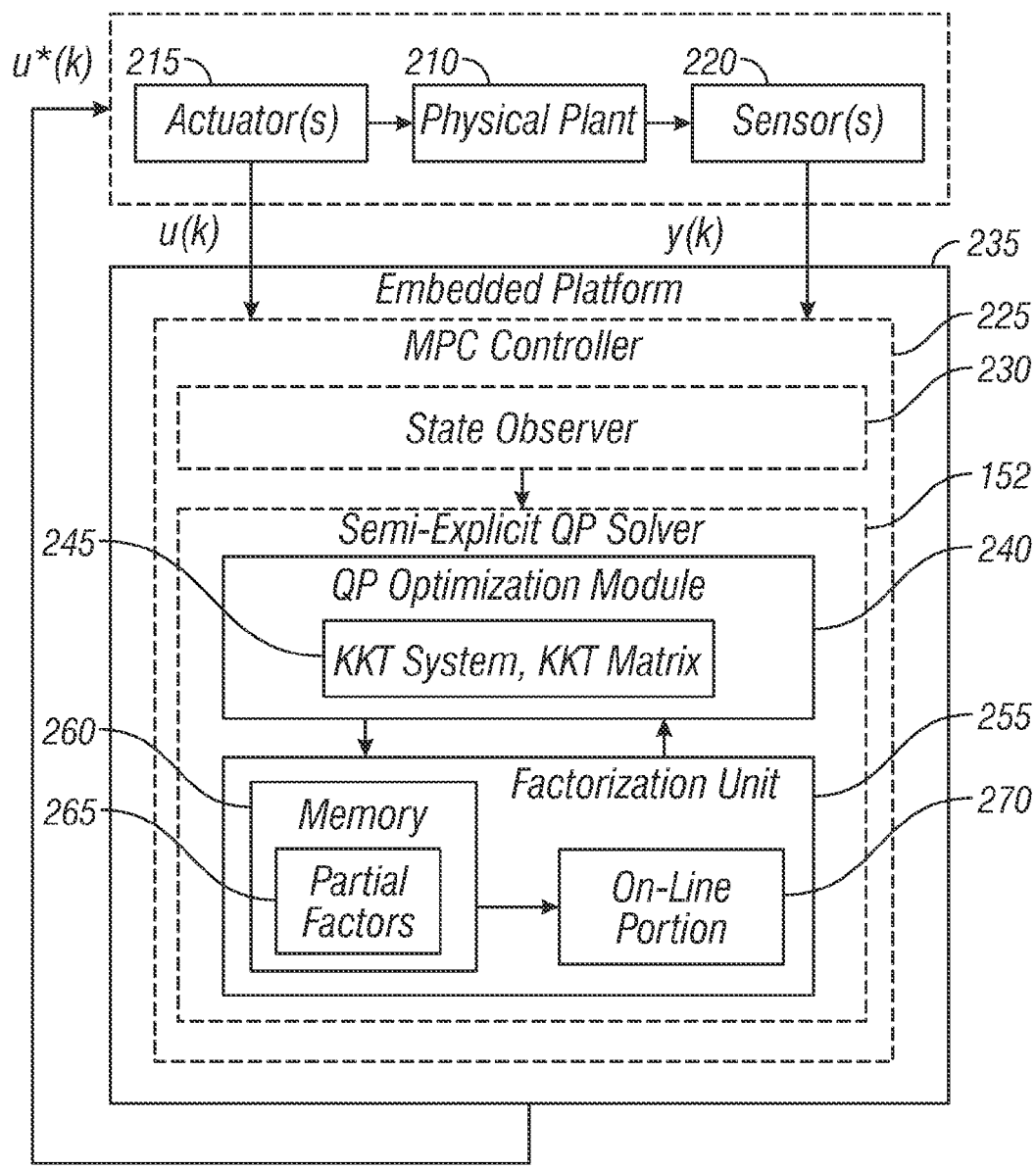
FIG. 3 illustrates a block diagram of an embedded system associated with a MPC controller having a semi-explicit QP solver, in accordance with the disclosed embodiments.

FIG. 3 illustrates a block diagram of a control system 100 associated with a MPC controller 225, in accordance with the disclosed embodiments. Note that in FIGS. 1-5, identical parts or elements are generally indicated by identical reference numerals. The MPC controller 225 generally includes a semi-explicit quadratic programming (QP) solver 152 in order to solve one or more control problems with respect to the system 200. Note that the control problems associated with the MPC controller 225 can be formulated as quadratic programming (QP) optimization problem with bound constraints. The control objectives can be typically expressed by a criterion function and by defining system constraints. The control action with respect to the MPC controller 225 can be computed by solving the optimization problem numerically at each sampling period in cases where there exists a sufficient computing resource.

The computational performances of the MPC controller 225 can be significantly affected by the quality and accuracy of the QP solver 152, which is internally utilized by the MPC controller 225 to obtain the optimal control trajectories (with respect to a criterion function and system constraints) based on the actual measurements. The semi-explicit QP solver 152 can be implemented as a core algorithm with respect to the MPC controller 225 in a wide range of embedded applications. The control system 200 can be an embedded system such as, for example, an automotive system or an aircraft control system. The MPC controller 225 associated with the semi-explicit QP solver 152 can be implemented as an Electronic Controller Unit (ECU) in the embedded applications. The MPC controller 225 includes a state observer 230 and the semi-explicit QP solver 152. Note that the embedded platform 235 associated with the MPC 225 can be implemented in context of a powerful data processing system 100, as illustrated in FIG. 1.

The semi-explicit QP solver 152 further includes the QP optimization module 240 and a factorization unit 255 for solving the optimization problems associated with the control system 200. The MPC controller 225, in association with the semi-explicit QP solver 152, provides the optimal control signal u*(k) with respect to the control system 200, which might be subject to constraints in the control variables, system states, and measured output variables. The optimal control signals in the MPC controller 225 can be generated by determining the state of a physical plant 210 associated with the control system 200 utilizing one or more actuators and sensors, such as an actuator 215 and a sensor 220, and the state observer 230 in the MPC controller 225. The actuators 215 and sensors 220 can be directly interconnected with the physical plant 210 of the control system 200.

The QP optimization module 240 associated with the semi-explicit QP solver 152 solves a linear system of equations (KKT system) associated with a matrix 245 in each iteration by using factorization and back substitution. Note that the matrix 245 disclosed herein as the Karush-Kuhn-Tucker (KKT) matrix and the factorization approach can be Cholesky factorization approach and a Null-space approach. The factorization approach can generally decompose an object (such as the matrix 245) into a product of other objects and/or factors. The matrix 245 can be factorized into a product of matrices. In general, the Karush-Kuhn-Tucker matrix 245 can be a block matrix in which a left-up block represents a real symmetric matrix, a right-down block is zero, and two other blocks are the matrices associated with active constraints at current iteration.

The factorization unit 255 of the semi-explicit QP solver 152 computes factorization of the KKT matrix in each iteration for actual combination of active constraints. The factorization computation has two parts. In the first part, the factorization unit 255 finds the partial factors 265 for the KKT matrix. These partial factors were pre-computed in the off-line part and are stored in memory 260. Then the on-line portion 270 of the factorization algorithm finishes the factorization in order to effectively solve the QP optimization problems in the embedded platform 235 of the MPC controller 225.

The QP problem with respect to the MPC controller 225 can be solved based on the standard active-set approach if the embedded platform 235 is equipped with a powerful CPU. Similarly, the fully explicit approach can be employed to solve the QP problem if the CPU is too slow and there is a large amount of memory. The semi-explicit approach enables to control allocation between CPU utilization and memory usage based on embedded platform configuration and thus it supports applicability to the control system 200 with relatively fast-sampling and low computation power and memory.

Figure 4:
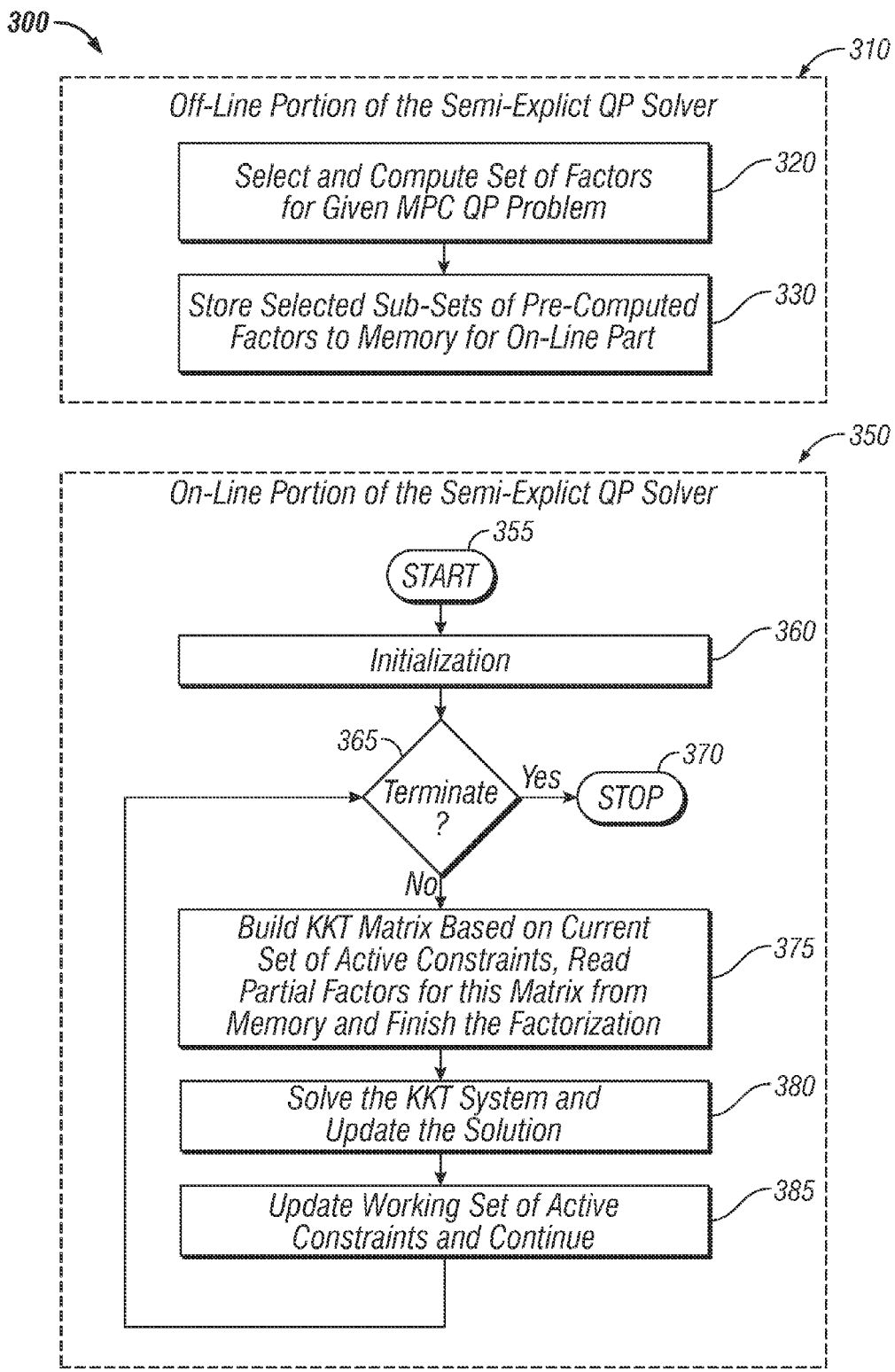
FIG. 4 illustrates a high level flow chart of operation illustrating logical operational steps of a method for solving a quadratic programming optimization problem by using a semi-explicit QP solver, in accordance with the disclosed embodiments.

FIG. 4 illustrates a high level flow chart of operation illustrating logical operational steps of a method 300 for solving parametric QP optimization problems with bound constraints in the MPC controller 225 utilizing the semi explicit QP solver 152, in accordance with the disclosed embodiments. The method 350 can be implemented as the core algorithm with respect to the MPC controller 225 for optimizing the QP problems. Note that the method 350 can be implemented in the context of a computer-useable medium that contains a program product including, for example, a module or group of modules. The KKT system with associated KKT matrix 245 can be solved at each iteration based on the factorization approach such as the Cholesky factorization combined with the null-space approach. The factors (or their parts) can be pre-computed off-line as illustrated at block 310.

The set of partial off-line factors 265 with respect to the QP problem can be pre-computed in the off-line portion 310 and stored into the memory 260, as indicated at block 320 and 330. The on-line portion of the semi-explicit QP solver is illustrated by 350. The solver is started 355 at each sampling period and is initialized in block 360 by using warm start technique. The termination conditions are examined in block 365. If the termination conditions are satisfied, then the algorithm stops 370. The factorization process of the KKT matrix based on the Cholesky factorization combined with the null-space approach with respect to the current active set of constraints can then be computed in the on-line part 270 of the factorization unit 255 based on the stored partial factors 265 of the semi-explicit QP solver 152 in order to effectively solve the QP optimization problems, as depicted at block 375. One iteration of the semi-explicit QP solver is finished by updating the solution in block 380 followed by updating the set of active constraints in block 385. Thereafter, the QP problem can be solved utilizing the standard active-set approach and/or the fully explicit approach based on the CPU utilization and memory usage with respect to the embedded platform 235 of the MPC controller 225. Such a system and method effectively enables allocation between the CPU utilization and memory usage based on the configuration and capability of the embedded platform 235.

Figure 5:
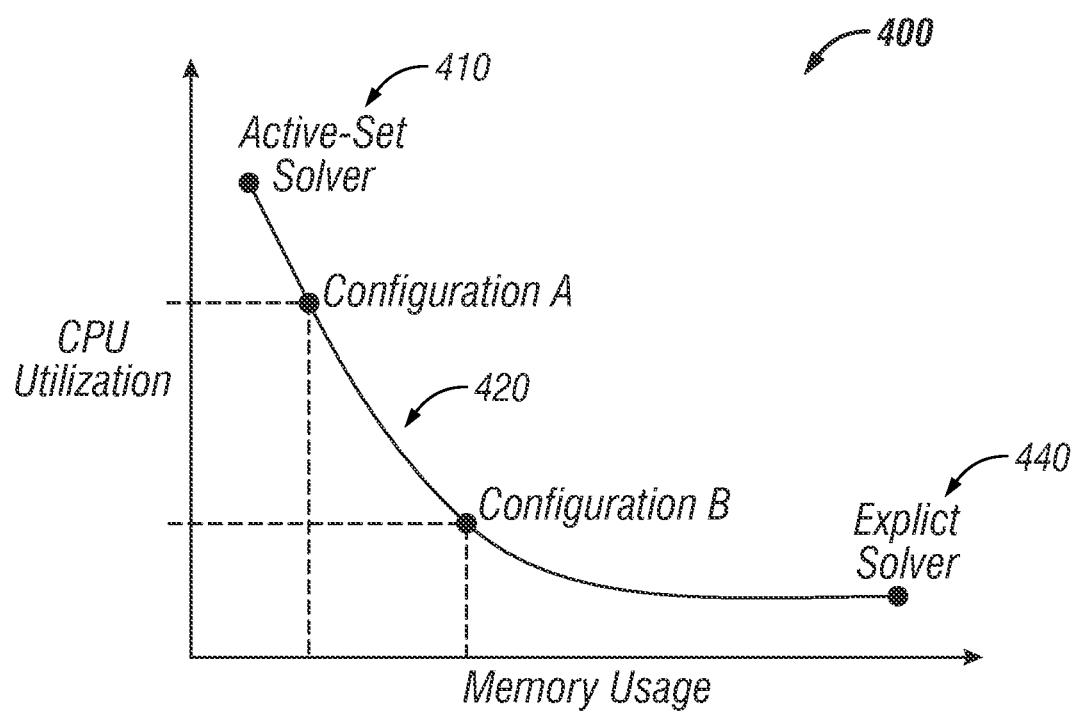
FIG. 5 illustrates a graph representing CPU and memory allocation with respect to the semi explicit QP solver, in accordance with the disclosed embodiments.

FIG. 5 illustrates a graph 400 representing CPU and memory allocation with respect to the semi-explicit QP solver 152, in accordance with the disclosed embodiments. The graph 400 represents the memory usage optimization and the CPU utilization with respect to the embedded platform 235. The region 410 illustrates an active-set solver and the region 440 illustrates an explicit solver. The semi-explicit QP solver 152 can be operated at any configuration 420 between the active set solver 410 and the explicit solver 440 based on the CPU and memory allocation. The compromise between the CPU utilization and the memory usage depends on the on-line computational complexity and on available storage capacity.

The method and system disclosed herein may include a flexible and user-friendly configurable controller based on model based predictive control technology for use in an embedded application. The QP solver associated with the MPC controller can be implemented as a general-purpose software module with respect to the embedded platform that may be configured by a calibration dataset. The system may offer a strong tool that optimizes the development and calibration time of the control system. An advantage of such an approach is that it may permit many different controller configurations, which can be achieved through simply modifying the calibration dataset. Note that the semi-explicit QP solver approach discussed herein can be utilized in a variety of applications including, but not limited to, for example, automotive (engine control) and aerospace applications.

Based on the foregoing, it can be appreciated that in some embodiments, a method can be implemented for solving a quadratic programming optimization problem. Such a method can include, for example, implementing a semi-explicit quadratic programming solver adapted to solve one or more quadratic programming problems utilizing one or more approaches based on utilization of a processor and memory usage requirements of a memory; solving a set of linear equations associated with a combination of active constraints and with the quadratic programming problem at each iteration of the semi-explicit quadratic programming solver based on a partial factorization approach; storing pre-computed partial factors of matrices associated with feasible combinations of active constraints in an off-line portion of the memory; and factorization of the matrices associated with feasible combinations of active constraints in the on-line part with respect to one or more quadratic programming problems by utilizing the partial factors stored in the off-line part portion associated with the semi-explicit quadratic programming solver to effectively solve the quadratic programming problem with a bound constraints with respect to an embedded platform.

In some embodiments of such a method, a step (or steps) can be provided for implementing the semi-explicit quadratic programming solver as a core algorithm with respect to a model predictive controller. In other embodiments of such a method (or the same embodiment), a step can be implemented for solving the aforementioned quadratic programming problem based on a standard active-set approach if the embedded platform is equipped with a powerful processor. In still other embodiments of such a method, a step can be implemented for solving the aforementioned quadratic programming problem based on a fully explicit approach if the processor associated with the embedded platform is too slow and includes a large amount of memory. In yet other embodiments of such a method, the semi-explicit quadratic programming solver can be configured to enable allocation between utilization of the processor and the memory based on a configuration and capability of the embedded platform. Additionally, the semi-explicit quadratic programming solver can include, for example, a combined gradient/Newton step projection based quadratic programming solver. The aforementioned factorization approach can also be, for example, a Cholesky factorization combined with the null-space approach, depending upon design considerations. The matrices associated with feasible combinations of active constraints can be, for example, Karush-Kuhn-Tucker matrices for the feasible combinations of active constraints.

It can be further appreciated, based on the foregoing, that a system is also disclosed for solving a quadratic programming optimization problem. Such a system can include, for example, a processor, a data bus coupled to the processor, and computer-usable medium embodying computer code. Such a computer-usable medium can be coupled to the data bus. Additionally, the aforementioned computer program code can include and/or be composed of instructions executable by the processor and configured for: implementing a semi-explicit quadratic programming solver adapted to solve one or more quadratic programming problems utilizing one or more approaches based on utilization of a processor and memory usage requirements of a memory; solving a set of linear equations associated with a combination of active constraints and with the quadratic programming problem (or problems) at each iteration of the semi-explicit quadratic programming solver based on a partial factorization approach; storing pre-computed partial factors of matrices associated with feasible combinations of active constraints in an off-line portion of the memory; and finalizing factorization of the matrices associated with feasible combinations of active constraints in the on-line part with respect to the quadratic programming problem(s) by utilizing the partial factors stored in the off-line part portion associated with the semi-explicit quadratic programming solver to effectively solve the quadratic programming problem(s) with a bound constraint with respect to an embedded platform.

In some embodiments of such a system, the aforementioned instructions can be further configured for implementing the semi-explicit quadratic programming solver as a core algorithm with respect to a model predictive controller. In other embodiments of such a system, such instructions can be configured for solving the quadratic programming problem(s) based on a standard active-set approach if the embedded platform is equipped with a powerful processor. In still other embodiments of such a system, such instructions can be configured for the aforementioned quadratic programming problem based on a fully explicit approach if the processor associated with the embedded platform is too slow and includes a large amount of memory. In such a system (or variations thereof), the semi-explicit quadratic programming solver can be configured to enable allocation between utilization of the processor and the memory based on a configuration and capability of the embedded platform. Additionally, in such a system (or variations thereof), the semi-explicit quadratic programming solver can be configured to function as a combined gradient/Newton step projection based quadratic programming solver. In such a system, the aforementioned factorization approach can be, for example, a Cholesky factorization combined with the null-space approach. Also, in such a system, the matrices associated with feasible combinations of active constraints can be, for example, Karush-Kuhn-Tucker matrices for the feasible combinations of active constraints.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for controlling an automotive or aircraft system using an embedded Model-Based Predictive Control (MPC) controller by solving a quadratic programming optimization problem with constraints at each of a series of control sampling periods, said method comprising:

implementing a semi-explicit quadratic programming solver in the embedded MPC controller that is adapted to solve the quadratic programming optimization problem with constraints at each of the series of control sampling periods;

using the embedded MPC controller to solve a set of linear equations associated with a combination of active constraints and with said quadratic programming optimization problem at each of the series of control sampling periods based on a partial factorization approach;

pre-computing a subset of partial factors of matrices associated with feasible combination of active constraints using an off-line factorization component, wherein the subset of partial factors includes less than all of the factors needed to solve the quadratic programming optimization problem;

storing the pre-computed subset of partial factors of matrices associated with feasible combinations of active constraints computed in the off-line factorization component in an off-line portion of a memory of the embedded MPC controller;

using the embedded MPC controller to finalize a factorization of said matrices associated with feasible combinations of active constraints using an on-line factorization component with respect to said quadratic programming optimization problem by utilizing said subset of partial factors stored in said off-line portion of said memory of the embedded MPC controller to effectively solve said at least one quadratic programming optimization problem with constraints; and providing a control signal from the embedded MPC controller to control at least part of the automotive or aircraft system, wherein the control signal is based at least part on the finalized factorization of said matrices.

2. The method of claim 1 further comprising solving said at least one quadratic programming optimization problem based on a standard active-set approach if the embedded MPC controller has a first processor and memory configuration.

3. The method of claim 2 further comprising solving said at least one quadratic programming optimization problem based on a fully explicit approach if the embedded MPC controller has a second processor and memory configuration, wherein the first processor and memory configuration is different from the second processor and memory configuration.

4. The method of claim 1 wherein said semi-explicit quadratic programming solver enables allocation between utilization of a processor and said memory of the embedded MPC controller.

5. The method of claim 1 wherein said semi-explicit quadratic programming solver comprises a combined gradient/Newton step projection based quadratic programming solver.

6. The method of claim 1 wherein said factorization approach comprises at least the following types of approaches:
a Cholesky factorization; and
a Null-space approach.

7. The method of claim 1 wherein said matrices associated with feasible combinations of active constraints comprise Karush-Kuhn-Tucker matrices for said feasible combinations of active constraints.

8. An embedded electronic control unit (ECU) configured to control an automotive or aircraft system by solving a quadratic programming optimization problem, said embedded electronic control unit (ECU) comprising:
a processor;
a memory;
computer code stored in the memory, said computer code comprising instructions executable by said processor and configured for:

implementing a semi-explicit quadratic programming solver configured to solve the quadratic programming optimization problem utilizing one of two or more approaches that depends, at least in part, on the processing and memory resources available in of the embedded electronic control unit (ECU);

solving a set of linear equations associated with a combination of active constraints and with said quadratic programming optimization problem based on a partial factorization approach at each of the series of control sampling periods of the embedded electronic control unit (ECU);

storing a subset of pre-computed partial factors of matrices associated with feasible combinations of active constraints in said memory of the embedded electronic control unit (ECU), wherein the subset of pre-computed partial factors includes less than all of the factors needed to solve the quadratic programming optimization problem;

finalizing factorization of said matrices associated with feasible combinations of active constraints with respect to said at least one quadratic programming optimization problem by utilizing said subset of partial factors stored in said memory of the embedded electronic control unit (ECU) to effectively solve said at least one quadratic programming optimization problem; and providing a control signal from the embedded electronic control unit (ECU) to control at least part of the automotive or aircraft system, wherein the control signal is based at least part on the finalized factorization of said matrices.

9. The system of claim 8 wherein said instructions are further configured for solving said at least one quadratic programming optimization problem based on a standard active-set approach if said embedded electronic control unit (ECU) has a first processor and memory configuration.

10. The system of claim 9 wherein said instructions are further configured for solving said at least one quadratic programming optimization problem based on a fully explicit approach if said embedded electronic control unit (ECU) has a second processor and memory configuration, wherein the first processor and memory configuration is different from the second processor and memory configuration.

11. The system of claim 8 wherein said semi-explicit quadratic programming solver enables allocation between utilization of said processor and said memory based on a configuration and capability of said embedded electronic control unit (ECU).

12. The system of claim 8 wherein said semi-explicit quadratic programming solver comprises a combined gradient/Newton step projection based quadratic programming solver.

13. The system of claim 8 wherein said factorization approach comprises at least the following types of approaches:
a Cholesky factorization; and
a Null-space approach.

14. The system of claim 8 wherein said matrices associated with feasible combinations of active constraints comprise Karush-Kuhn-Tucker matrices for said feasible combinations of active constraints.

15. An embedded electronic control unit (ECU) configured to control an automotive system by solving a quadratic programming optimization problem, said embedded electronic control unit (ECU) comprising:
a processor;
a memory;

computer code stored in the memory, said computer program code comprising instructions executable by said processor and configured for:

implementing a semi-explicit quadratic programming solver configured to solve the quadratic programming optimization problem utilizing an approach that is based, at least in part, on the processing and memory resources available in the embedded electronic control unit (ECU);

solving a set of linear equations associated with a combination of active constraints and with said at least one quadratic programming optimization problem based on a partial factorization approach at each of the series of control sampling periods of the embedded electronic control unit (ECU);

storing a subset of pre-computed partial factors of matrices associated with feasible combinations of active constraints in said memory of the embedded electronic control unit (ECU), wherein the subset of pre-computed partial factors includes less than all of the factors needed to solve the quadratic programming optimization problem;

finalizing factorization of said matrices associated with feasible combinations of active constraints with respect to said at least one quadratic programming optimization problem by utilizing said subset of partial factors stored in said memory of the embedded electronic control unit (ECU) to effectively solve said at least one quadratic programming optimization problem; and providing a control signal from the embedded electronic control unit (ECU) to control at least part of the automotive system, wherein the control signal is based at least part on the finalized factorization of said matrices.

16. The system of claim 15 wherein said semi-explicit quadratic programming solver comprises a combined gradient/Newton step projection based quadratic programming solver.

17. The system of claim 15 wherein said factorization approach comprises at least the following types of approaches:

a Cholesky factorization; and a Null-space approach.

18. The system of claim 15 wherein said matrices associated with feasible combinations of active constraints comprise Karush-Kuhn-Tucker matrices for said feasible combinations of active constraints.

* * * * *